(12) United States Patent
Singh

(10) Patent No.: US 12,045,835 B2
(45) Date of Patent: Jul. 23, 2024

(54) IMAGE-BASED SEARCH AND PREDICTION SYSTEM FOR PHYSICAL DEFECT INVESTIGATIONS

(71) Applicant: Dell Products L.P., Round Rock, TX (US)

(72) Inventor: Shalu Singh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/154,390

(22) Filed: Jan. 21, 2021

(65) Prior Publication Data

US 2022/0230180 A1 Jul. 21, 2022

(51) Int. Cl.
*G06Q 30/012* (2023.01)
*G06F 18/214* (2023.01)
(Continued)

(52) U.S. Cl.
CPC ......... *G06Q 30/012* (2013.01); *G06F 18/214* (2023.01); *G06F 18/241* (2023.01); *G06N 5/04* (2013.01); *G06N 20/00* (2019.01); *G06Q 10/10* (2013.01); *G06T 7/0004* (2013.01); *G06T 2207/20081* (2013.01)

(58) Field of Classification Search
None
See application file for complete search history.

(56) References Cited

U.S. PATENT DOCUMENTS

2016/0275521 A1* 9/2016 Afshar ................. G06Q 30/012
2016/0350756 A1* 12/2016 Shepard ............... G06V 30/142
(Continued)

FOREIGN PATENT DOCUMENTS

WO    WO-2019067641 A1 *   4/2019   ......... G02B 27/0172

OTHER PUBLICATIONS

Ming-Yu Liu, Xun Huang, Arun Mallya, Tero Karras, Timo Aila, Jaakko Lehtinen, Jan Kautz; Proceedings of the IEEE/CVF International Conference on Computer Vision (ICCV), 2019, pp. 10551-10560 (Year: 2019).*

(Continued)

*Primary Examiner* — Michael Young
(74) *Attorney, Agent, or Firm* — Ryan, Mason & Lewis, LLP

(57) ABSTRACT

Techniques are provided for image-based search and prediction for physical defect investigations. One method comprises obtaining, for multiple investigations of physical defects associated with corresponding devices, (i) images of the physical defects, (ii) descriptions of the physical defects, and (iii) descriptions of a manual classification of the physical defects; storing the images for each investigation in an image repository, wherein each stored image comprises a set of tags based on the corresponding description of the physical defect and the corresponding description of the manual classification of the physical defect; and training an image classification model using the stored images, each with the corresponding description of the physical defect and the corresponding manual classification of the physical defect. A given investigation of a physical defect can be resolved using the image repository and/or the trained image classification model.

20 Claims, 9 Drawing Sheets

(51) Int. Cl.
*G06F 18/241* (2023.01)
*G06N 5/04* (2023.01)
*G06N 20/00* (2019.01)
*G06Q 10/10* (2023.01)
*G06T 7/00* (2017.01)

(56) References Cited

U.S. PATENT DOCUMENTS

2019/0096135 A1* 3/2019 Dal Mutto ............ G06T 19/006
2021/0073272 A1* 3/2021 Garrett .................. G06N 3/084

OTHER PUBLICATIONS https://azure.microsoft.com/en-us/use-cases/defect-detection-with-image-analysis/, downloaded on Jan. 19, 2021.
https://arxiv.org/pdf/1904.04671.pdf, downloaded on Jan. 19, 2021.
https://www.ncbi.nlm.nih.gov/pmc/articles/PMC7085592/, downloaded on Jan. 19, 2021.
https://nanonets.com/blog/ai-visual-inspection/, downloaded on Jan. 19, 2021.

* cited by examiner

IMAGE-BASED SEARCH AND PREDICTION SYSTEM FOR PHYSICAL DEFECT INVESTIGATIONS

FIELD

The field relates generally to information processing systems, and more particularly to the processing of data in such information processing systems.

BACKGROUND

Physical defects, such as cracks, scratches or other physical damage to a portion of a device, such as a display, a keyboard or a housing of the device, often need to be investigated. Such investigations, however, are often heavily dependent on a description of the problem provided by a customer and/or of a manual screening of the physical defect performed by a support agent, especially when the physical defects are related to wear and tear and/or cosmetic damage.

A need exists for a systematic mechanism for investigating physical defects.

SUMMARY

In one embodiment, a method comprises obtaining, for each of a plurality of investigations of a physical defect associated with a corresponding device, (i) one or more images of the physical defect, (ii) a description of the physical defect, and (iii) a description of a classification of the physical defect; storing the one or more images for each investigation in an image repository, wherein each stored image comprises a set of tags based at least in part on the corresponding description of the physical defect and the corresponding description of the classification of the physical defect; and training one or more image classification models using each of at least a plurality of the stored images with the corresponding description of the physical defect and the corresponding description of the classification of the physical defect, wherein a given investigation of a physical defect is resolved at least in part using one or more of the image repository and the trained one or more image classification models.

In some embodiments, the trained image classification model may provide a predicted cause of the physical defect and a policy-based recommendation for a treatment of the given investigation under an applicable warranty. Images from the image repository that are relevant to the given investigation may be identified by applying a description of the physical defect associated with the given investigation to an image-based search engine.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for image-based search and prediction for physical defect investigations.

In one or more embodiments, the disclosed image-based search and prediction techniques provide assistance to human support agents that perform manual screening for visual troubleshooting tasks related to physical defects or other similar support-related scenarios using an image-based search engine that identifies one or more images related to a particular investigation of a physical defect. In some embodiments, the disclosed techniques for image-based search and prediction provide an automated mechanism for resolving investigations of physical defects and other physical hardware anomalies using one or more trained image classification models.

In some embodiments, the disclosed image-based search and prediction techniques provide a mechanism for investigating physical defects and other common "visual" troubleshooting and support-related scenarios. In addition, a rule-based policy evaluation mechanism is provided for determining warranty eligibility using one or more rules indicating whether particular defects are covered under a given warranty associated with one or more products.

Figure 1:
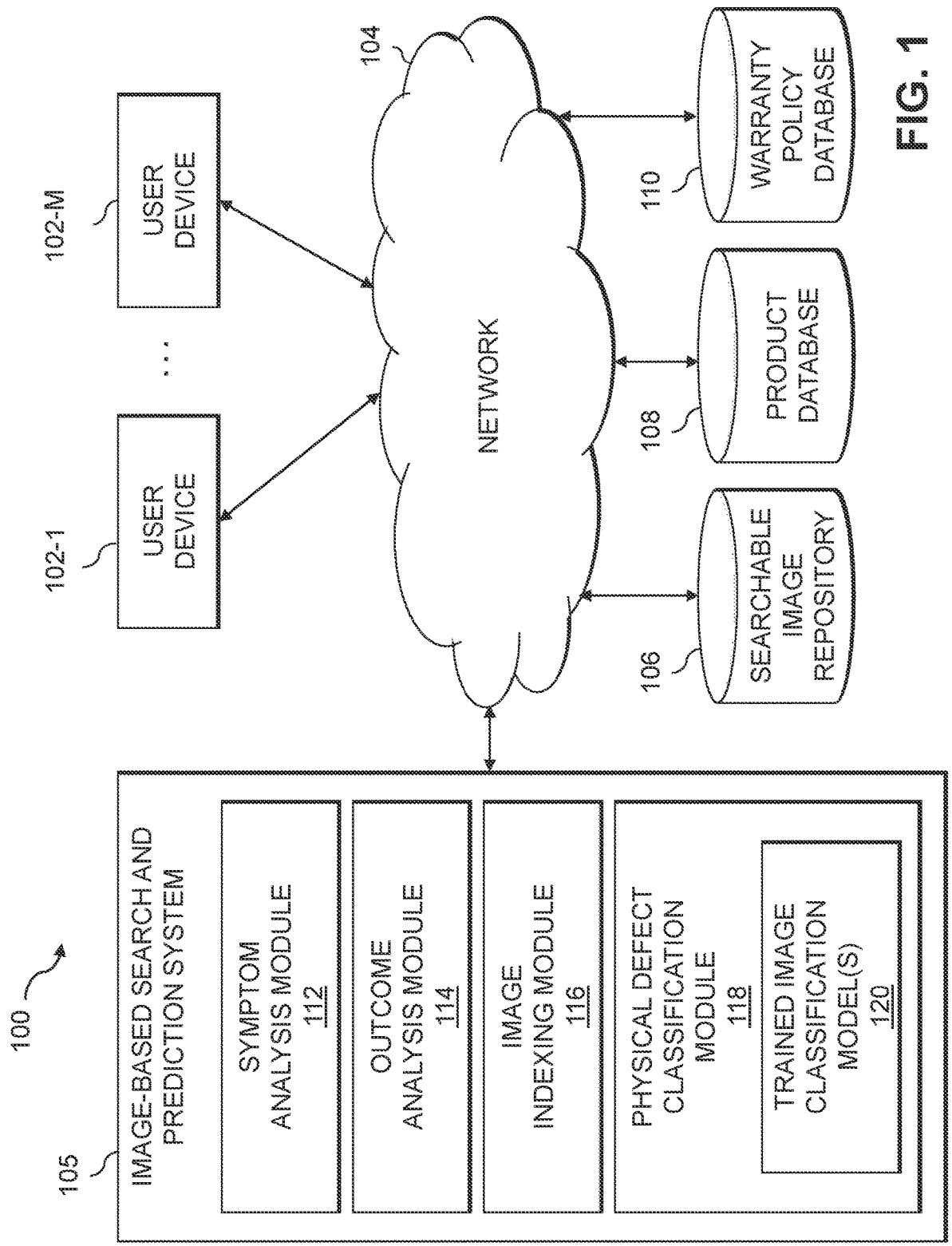
FIG. 1 illustrates an information processing system configured for image-based search and prediction for physical defect investigations in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is an image-based search and prediction system 105, a searchable image repository 106, a product database 108 and a warranty policy database 110, each discussed below.

The user devices 102 may comprise, for example, host devices and/or devices such as mobile telephones, laptop computers, tablet computers, desktop computers, appliances, electronics products, or other types of computing devices. Such devices are examples of what are more generally referred to herein as "processing devices." Some of these processing devices are also generally referred to herein as "computers." In some embodiments, a customer submitting a claim for a physical defect associated with a particular device may use a first one of the user devices 102 and a support agent that processes the claim for the physical defect from the customer may use another of the user devices 102.

In addition, one or more of the user devices 102, or portions thereof (e.g., display panels, ports, memory, hard drives, processors, and/or device housing), as well as storage devices, may be the device associated with a submitted claim regarding a physical defect. A number of example defects that may be evaluated using the disclosed image-based techniques are discussed further below.

The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (TO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The image-based search and prediction system 105 may be implemented, for example, on the cloud or on the premises of an enterprise or another entity. In some embodiments, the image-based search and prediction system 105, or portions thereof, may be implemented as part of a storage system or on a host device. As also depicted in FIG. 1, the image-based search and prediction system 105 further comprises a symptom analysis module 112, an outcome analysis module 114, an image indexing module 116, and a physical defect classification module 118 that further comprises one or more trained image classification models 120, each discussed further below.

It is to be appreciated that this particular arrangement of modules 112, 114, 116 and 118 illustrated in the image-based search and prediction system 105 of the FIG. 1 embodiment is presented by way of example only, and alternative arrangements can be used in other embodiments. For example, the functionality associated with one or more of the modules 112, 114, 116 and 118 in other embodiments can be implemented as a single module or device, or separated across a larger number of modules. As another example, multiple distinct processors can be used to implement different ones of modules 112, 114, 116 and 118, or portions thereof.

At least portions of modules 112, 114, 116 and 118 may be implemented at least in part in the form of software that is stored in memory and executed by a processor. An exemplary process utilizing one or more of modules 112, 114, 116 and 118 for an example image-based search and prediction system 105 in computer network 100 will be described in more detail with reference to, for example, FIGS. 2 through 7.

Additionally, the image-based search and prediction system 105 can have an associated searchable image repository 106 configured to store, for example, customer-supplied images pertaining to one or more investigations of physical defects using the disclosed techniques for image-based search and prediction. In addition, the image-based search and prediction system 105 can have an associated product database 108 configured to store, for example, model-specific information associated with various products, for example, by brand, product model or other criteria.

In some embodiments, the image-based search and prediction system 105 can have a warranty policy database 110 configured to store, for example, warranty details (e.g., rules indicating defects that are covered under a given warranty) associated with various products.

In at least some embodiments, a warranty for a purchased product may allow the product to be returned, replaced, or repaired, under certain circumstances. A warranty, however, typically does not protect against all defects or damage. Physical device damage, for example, may not be covered by a warranty. The term "physical defect" as used herein is intended to be broadly construed, so as to encompass, for example, cracks, scratches and/or other physical damage to the display, keyboard, housing, bezel or accessories associated with a product, as well as damage from liquid spills, wear and tear, or other types of physical hardware anomalies.

One or more of the searchable image repository 106, product database 108 and warranty policy database 110 in the present embodiment are implemented using one or more storage systems associated with the image-based search and prediction system 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

At least some of the user devices 102 and the image-based search and prediction system 105 may be implemented on a common processing platform, or on separate processing platforms. The user devices 102 (for example, when implemented as host devices) are illustratively configured to write data to and read data to/from the storage system in accordance with applications executing on those host devices for system users.

The computer network 100 may also comprise one or more storage devices, such as the storage systems used to implement one or more of the searchable image repository 106, product database 108 and warranty policy database 110. The storage devices illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that numerous different types of storage devices can be investigated in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

In some embodiments, communications between the user devices 102 over the network 104 with the image-based search and prediction system 105 may comprise 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the image-based search and prediction system 105, and/or other devices.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the image-based search and prediction system 105 can be one or more input-output devices (not shown), which illustratively comprise keyboards, displays or other types of input-output devices in any combination. Such input-output devices can be used, for example, to support one or more user interfaces to the image-based search and prediction system 105, as well as to support communication between the image-based search and prediction system 105 and other related systems and devices not explicitly shown.

The user devices 102 and the image-based search and prediction system 105 in the FIG. 1 embodiment are assumed to be implemented using at least one processing device. Each such processing device generally comprises at least one processor and an associated memory, and implements one or more functional modules for controlling certain features of the image-based search and prediction system 105.

More particularly, user devices 102 and image-based search and prediction system 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface allows the user devices 102 and/or the image-based search and prediction system 105 to communicate over the network 104 with each other (as well as one or more other networked devices), and illustratively comprises one or more conventional transceivers.

It is to be understood that the particular set of elements shown in FIG. 1 for image-based search and prediction for physical defect investigations is presented by way of illustrative example only, and in other embodiments additional or alternative elements may be used. Thus, another embodiment includes additional or alternative systems, devices and other network entities, as well as different arrangements of modules and other components.

Figure 2:
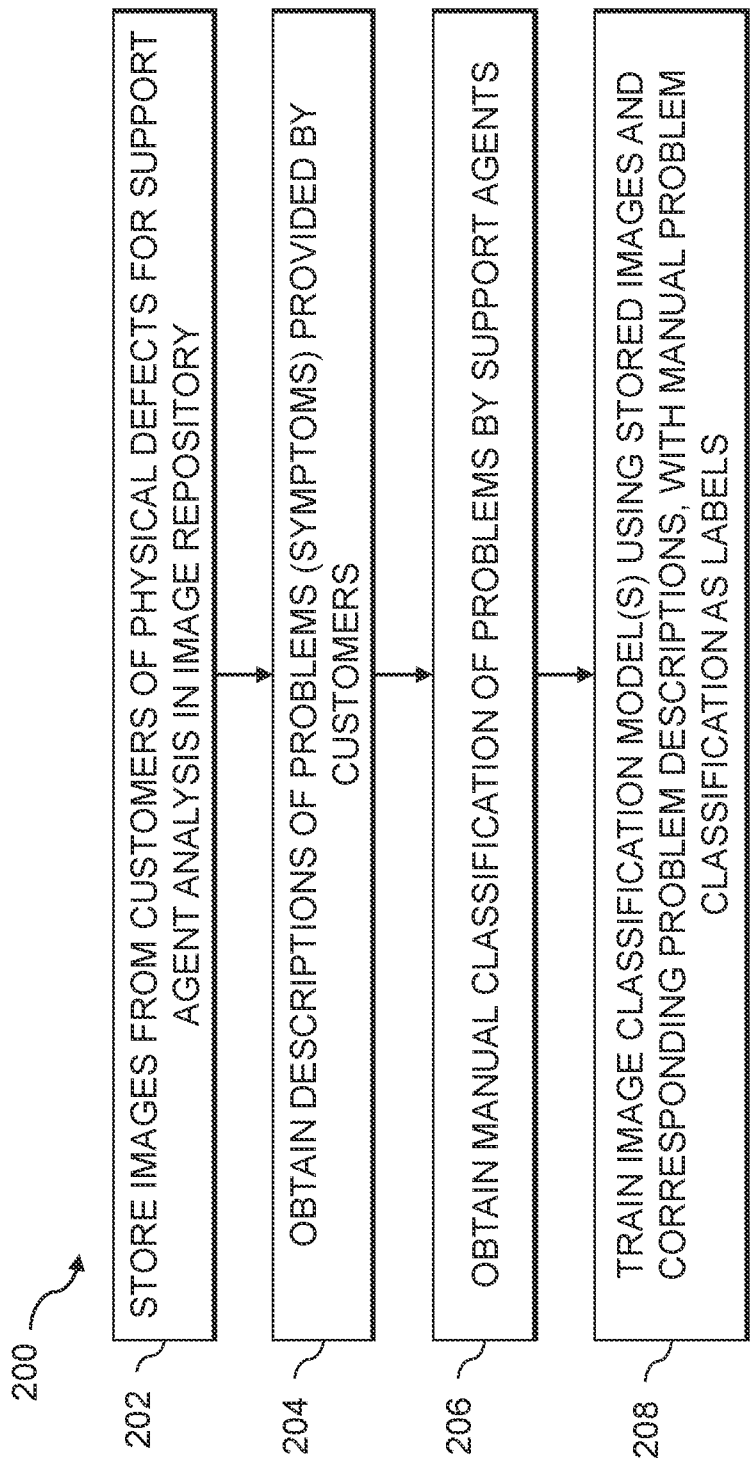
FIG. 2 is a flow diagram illustrating an exemplary implementation of a model training process for image-based search and prediction, according to some embodiments of the disclosure.

FIG. 2 is a flow diagram illustrating an exemplary implementation of a model training process 200 for image-based search and prediction, according to some embodiments of the disclosure. In the example of FIG. 2, images of physical defects received from customers for support agent analysis are stored in an image repository in step 202.

Descriptions of one or more problems (e.g., symptoms) provided by customers are obtained in step 204, and corresponding manual classifications of the problems generated by support agents are obtained in step 206.

Finally, one or more image classification models are trained in step 208 using the stored images and corresponding problem descriptions, with the corresponding manual problem classification used as labels (e.g., predicted defect cause labels) for the training process.

Figure 3:
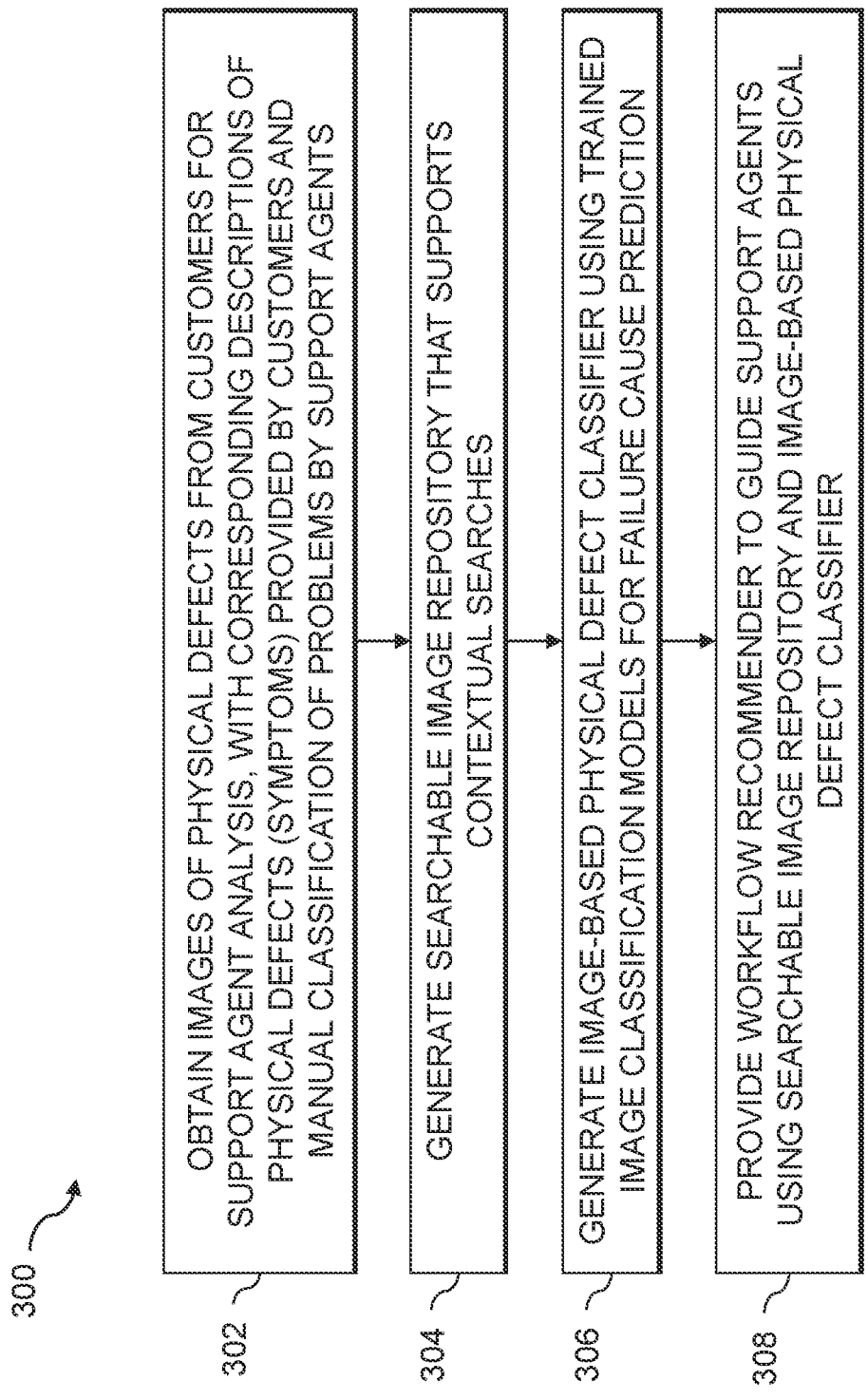
FIG. 3 is a flow diagram illustrating an exemplary implementation of an image-based search and prediction process for the creation of one or more trained image classification models and a searchable image repository, according to an embodiment.

FIG. 3 is a flow diagram illustrating an exemplary implementation of an image-based search and prediction process 300 for the creation of one or more trained image classification models 120 and a searchable image repository 106, according to an embodiment. In the example of FIG. 3, images of physical defects are obtained in step 302 from customers for support agent analysis, with corresponding descriptions of the physical defects (e.g., symptoms) provided by the customers and corresponding manual classifications of the problems that were generated by the support agents that performed the physical defect investigations.

In step 304, the searchable image repository 106 that supports contextual searches is generated by the image-based search and prediction process 300, and the image-based physical defect classifier is generated in step 306 that uses the trained image classification models 120 for prediction of the cause of particular physical defects. Finally, the image-based search and prediction process 300 provides a workflow recommender in step 308 to guide support agents using the searchable image repository 106 and image-based physical defect classifier. For example, the workflow recommender can identify a next best action in the agent workflow based on a sequence of actions by a support agent that investigated a similar, previous physical defect.

Figure 4:
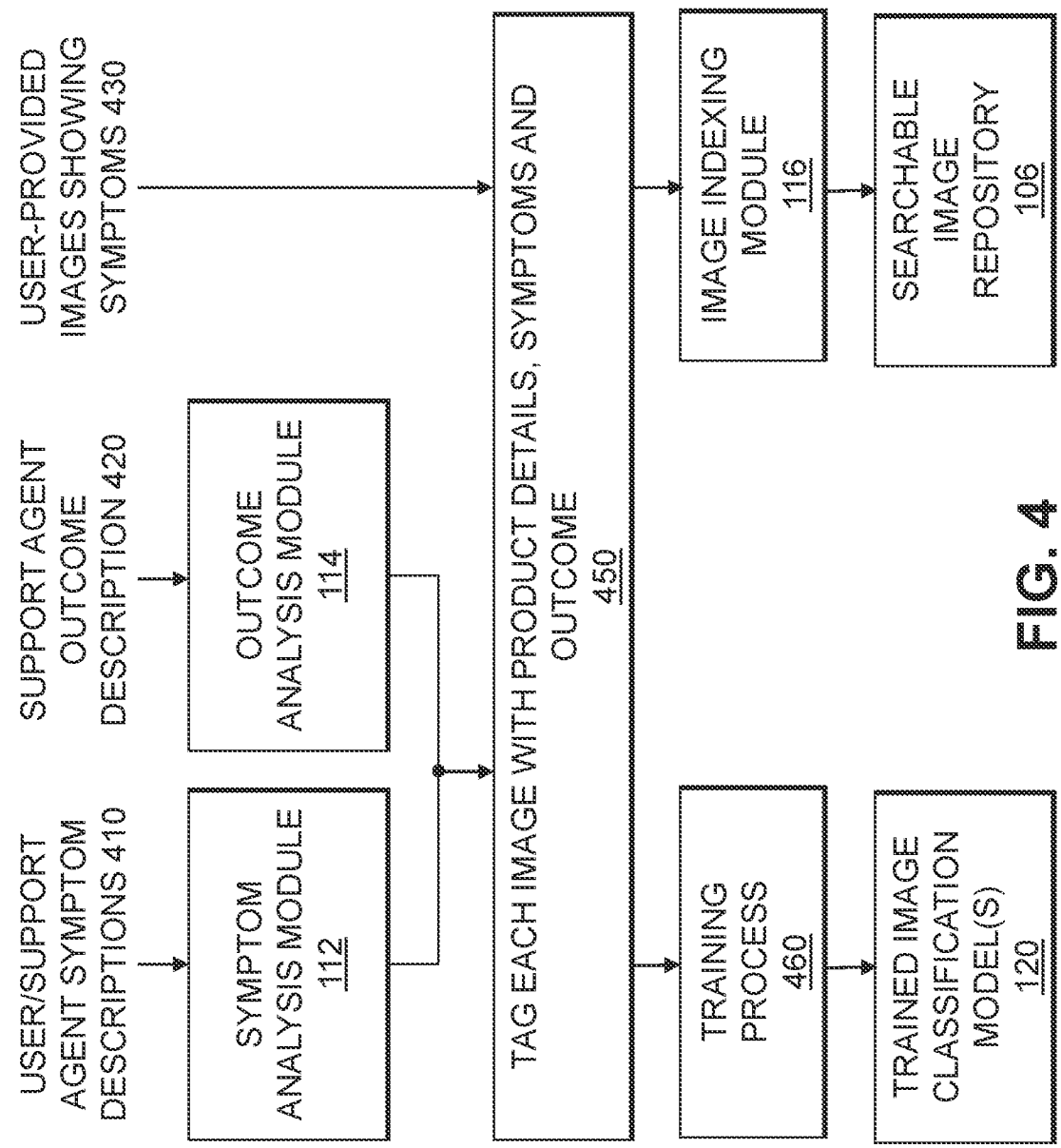
FIG. 4 is a flow diagram illustrating the image-based search and prediction process of FIG. 3 in further detail, according to one embodiment.

FIG. 4 is a flow diagram illustrating the image-based search and prediction process 300 of FIG. 3 in further detail, according to one embodiment. As shown in FIG. 4, symptom descriptions 410 from one or more users and/or one or more support agents are applied to the symptom analysis module 112 of FIG. 1. For example, text mining and classification techniques can be applied by the symptom analysis module 112 to analyze customer and/or agent descriptions of symptoms of the physical defects. In addition, file extension, file size, as well as unique identifiers that match a case number can be analyzed. Symptoms can also be derived from existing classifications selected by agents, a classification algorithm and/or by text mining using keywords and/or a whitelist of terms.

In addition, a description 420 of the outcome determined by one or more support agents is applied to the outcome analysis module 114 of FIG. 1. In one or more embodiments, the outcome analysis module 114 can process metadata and/or additional contextual information related to a particular investigation, such as brand information, product information, such as product family information, product age, form factor, country, customer segment (e.g., academic, personal and enterprise user), and part numbers, and dispatched support or repair materials. In addition, the outcome analysis module 114 can analyze failure reports related to particular investigations to obtain diagnosed failure categories. The investigation resolution can be derived, for example, from parts shipped in an accidental damage dispatch, or parts that needed repair.

The outputs of the symptom analysis module 112 and the outcome analysis module 114, as well as user-provided images 430 showing symptoms (which may optionally be filtered by one or more specified criteria, such as file size) are processed in step 450 to tag each image with product details, symptoms and/or outcome. In some embodiments, the tags are stored with each image as metadata. The file size criteria, for example, can suppress an importation of images that are not related to a particular physical defect, such as images (e.g., logos) in the signature portion of an email from a customer.

The tagged images from step 450 are applied to a training process in step 460, which generates one or more of the trained image classification models 120. In addition, the tagged images from step 450 are applied to the image indexing module 116 of FIG. 1 which generates the searchable image repository 106.

Figure 5:
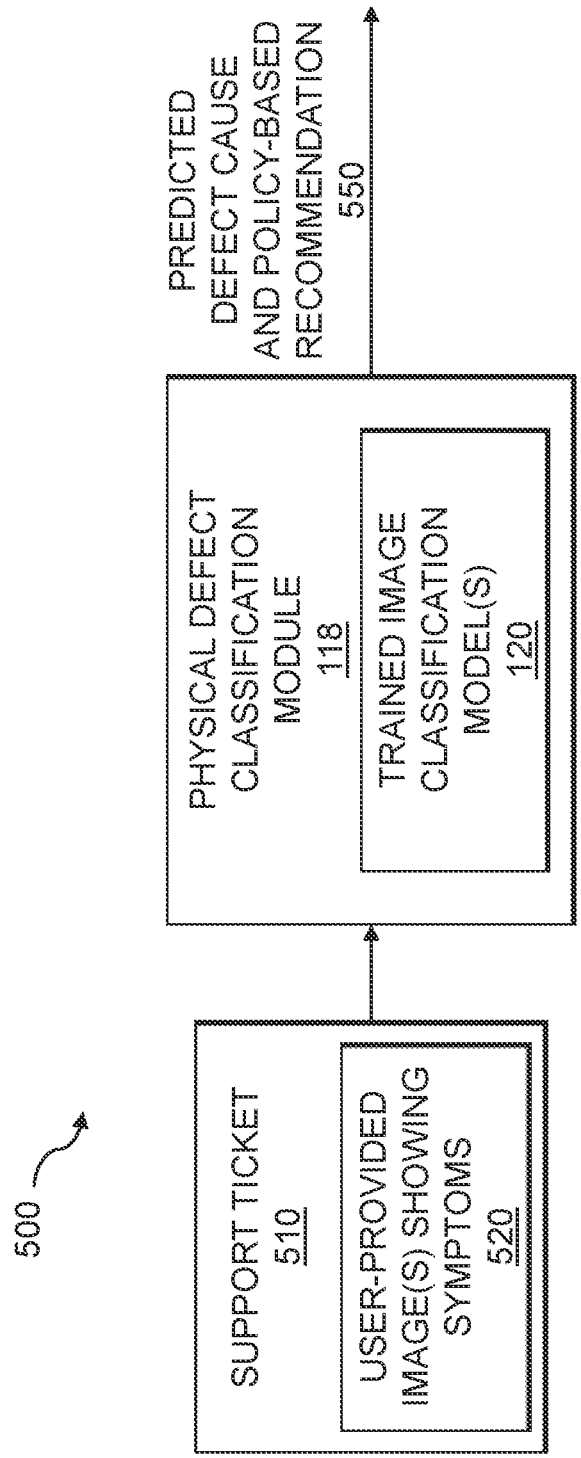
FIG. 5 illustrates a processing of a support ticket comprising user-provided images showing symptoms of a physical defect using the physical defect classification module of FIG. 1, according to one or more embodiments of the disclosure.

FIG. 5 illustrates a processing 500 of a support ticket 510 comprising user-provided images 520 that show symptoms of a physical defect using the physical defect classification module 118 of FIG. 1, according to one or more embodiments of the disclosure. Generally, the physical defect classification module 118 receives the images 520 as an input and uses the trained image classification models 120 to generate a possible failure cause as an output 550, such as a predicted defect cause and a policy-based recommendation.

Figure 6:
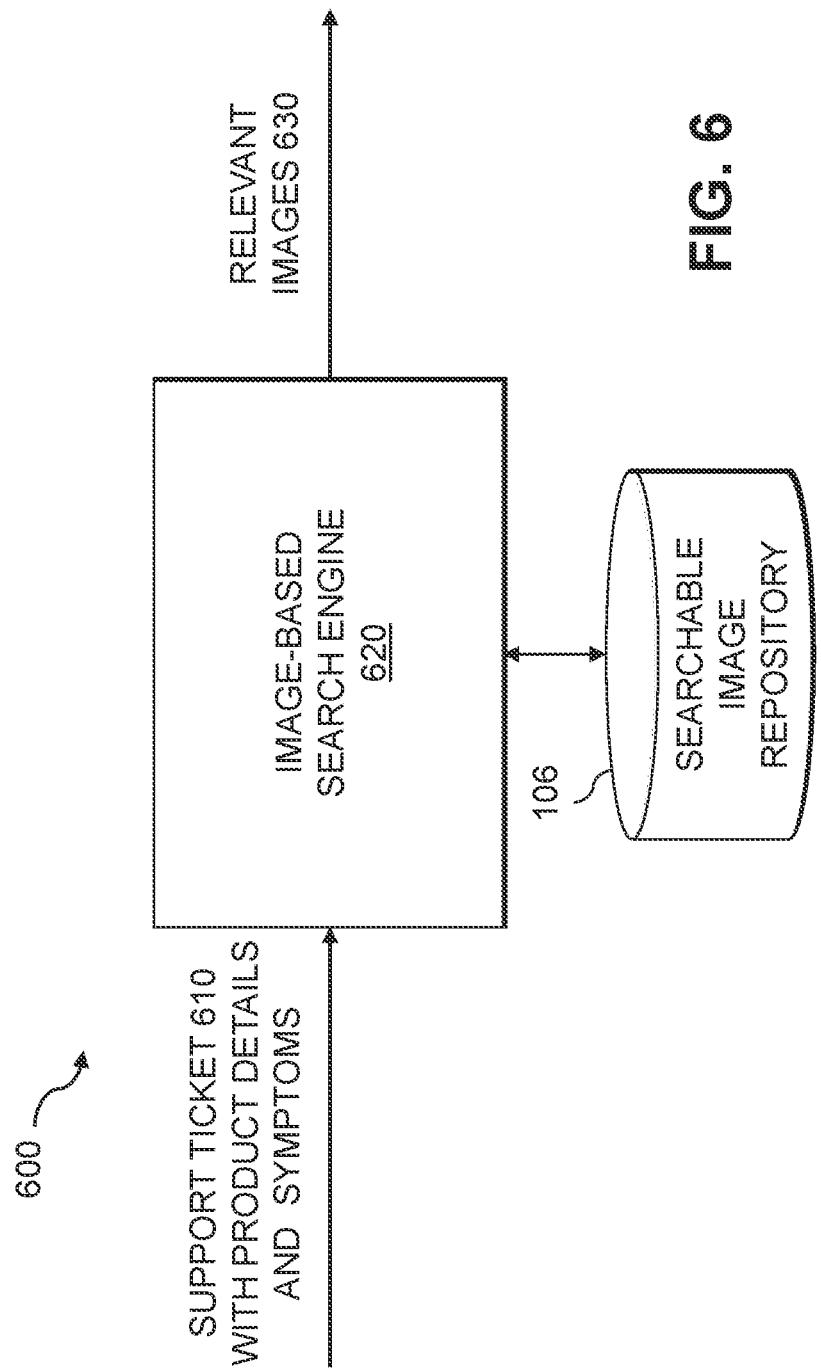
FIG. 6 illustrates a processing of a support ticket comprising product details and symptoms of a physical defect using an image-based search engine, according to at least one embodiment.

FIG. 6 illustrates a processing 600 of a support ticket 610 comprising product details and symptoms of a physical defect using an image-based search engine 620, according to at least one embodiment. The product detail tags and symptoms are applied to the image-based search engine 620 as inputs, and the image-based search engine 620 identifies one or more images from the searchable image repository 106 that are relevant to the support ticket 610.

The image-based search engine 620 evaluates the contextual information from the support ticket 610 against the images in the searchable image repository 106 and identifies one or more relevant images 610 that are relevant to the physical defect identified in the support ticket 610. In some embodiments, the support agent can compare the identified images to the physical defect associated with the support ticket 610 (e.g., by a visual inspection of the device associated with the support ticket 610 and/or by evaluating images of the device associated with the support ticket 610).

In this manner, the searchable image repository 106 provides a reference library with contextual search enabled for agent reference and comparison. The support agent can enter search terms comprising one or more tags associated with the support ticket 610, such as symptoms of the support ticket 610 and product-related details). For example, for a pixel failure, the support ticket 610 may enter product brand and model information, as well as relevant manufacture dates. The identified images from the searchable image repository 106 that are relevant to the support ticket 610 allow the support agent to compare characteristics of previously processed defects to the current defect and to handle the current support ticket 610 in a similar manner.

Figure 7:
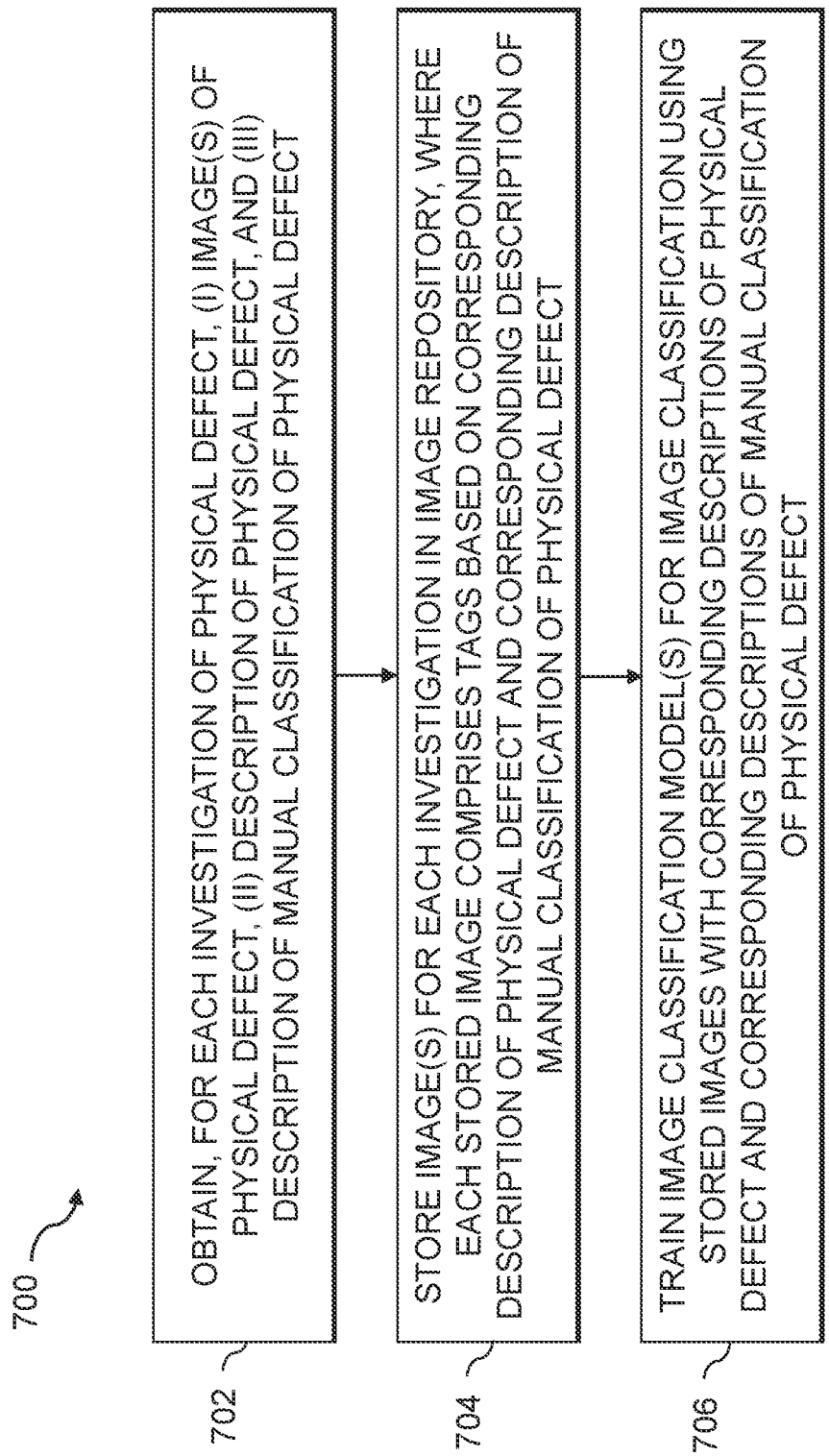
FIG. 7 is a flow diagram illustrating an exemplary implementation of an image-based search and prediction process for the creation of an image repository and one or more trained image classification models, according to some embodiments of the disclosure.

FIG. 7 is a flow diagram illustrating an exemplary implementation of an image-based search and prediction process 700 for the creation of an image repository and one or more trained image classification models 120, according to some embodiments of the disclosure. In step 702, the exemplary image-based search and prediction process 700 obtains, for each investigation of a physical defect, (i) one or more images of the physical defect, (ii) a description of the physical defect, and (iii) a description of the manual classification of the physical defect performed by a support agent. The term "description of a classification of a physical defect" (and other similar expressions) as used herein is intended to be broadly construed so as to encompass, by way of illustration and without limitation, a textual description of a classification of an outcome by a user (e.g., a support agent), and a classification code (or other classification) assigned by a user (e.g., a support agent) or a processing device.

In step 704, the image-based search and prediction process 700 stores the one or more obtained images for each investigation in an image repository, where each stored image comprises tags based on the corresponding description of the physical defect and the corresponding description of the manual classification of physical defect by the support agent.

The one or more image classification models are trained in step 706 for image classification using the stored images with the corresponding descriptions of the physical defect and the manual classification of physical defect.

Consider a physical defect related to one or more LCD (liquid crystal display) pixels on a device. An applicable warranty may cover the particular physical defect depending on the pixel type, pixel count and part numbers. For example, if investigation determines that the warranty applies, the coverage may include replacing the display with a new screen. If investigation, however, determines that the warranty does not apply, the customer would have to pay for any replacement.

The warranty coverage may be resolved by determining a type or classification of the pixel damage. For example, the investigation may determine whether each pixel on the display is classified as "black" (e.g., permanently unlit) or "white" (e.g., permanently unlit). In addition, a count of the anomalous pixels may be applied to associated thresholds to determine the warranty coverage. For example, a policy may specify that one or more bright pixels, or six or more dark pixels may not be acceptable and will be covered by the warranty. In this manner, warranty coverage may be based, for example, on the pixel type, pixel count, applicable customer warranty, and part numbers.

In one or more embodiments, the disclosed techniques for image-based search and prediction for physical defect investigations may initially analyze prior LCD pixel defect investigations from a database, such as a CRM (customer relationship manager) database, and then classify tags based on notes from the prior investigations (such as pixel/non-pixel related symptoms), and the corresponding outcome (e.g., covered in warranty).

Thereafter, any corresponding images of the physical defects associated with the prior investigations can be obtained, for example, from emails or chat records associated with the investigations.

With the repository of prior classified images, the searchable image repository 106 can be generated, in the manner described above, that supports contextual searches that allow images relevant to a new support ticket 610 to be identified. In addition, the image-based physical defect classifier can be generated, in the manner described above, that uses the trained image classification models 120 for failure cause prediction.

Now consider a physical defect related to cracked displays on a device. An applicable warranty may cover the particular physical defect depending on whether the damages was intentionally caused by the user (or by user neglect), as opposed to damage caused by a defect in the product. Screens that are damaged intentionally by a user or through neglect, for example, by dropping a device, will have shattered glass with one central point of damage and spider web cracks or square cracks (depending on the panel type). Screens that are damaged through a product defect, however, will have shattered glass starting from one side of the screen and have internal ink-like marks. Thus, if the support agent can access images of prior cracked display defects using the disclosed techniques, the support agent can evaluate the warranty coverage for the current investigation in a similar manner as the previously investigated cracked display defects.

Finally, consider a physical defect related to plastic elements on a device. An applicable warranty may also cover the particular physical defect depending on whether the damages was intentionally caused by the user (or by user neglect), as opposed to damage caused by a defect in the product. Screens that are damaged intentionally by a user or through neglect, for example, by dropping a device, will have shattered glass with one central point of damage and spider web cracks or square cracks (depending on the panel type). Screens that are damaged through a product defect, however, will typically start at hinges or other areas of stress and show up as hairline cracks. Thus, if the support agent can access images of prior plastic defects using the disclosed techniques, the support agent can evaluate the warranty coverage for the current investigation in a similar manner as the previously investigated plastic defects.

The particular processing operations and other network functionality described in conjunction with the flow diagrams of FIGS. 2 through 4 and 7, for example, are presented by way of illustrative example only, and should not be construed as limiting the scope of the disclosure in any way. Alternative embodiments can use other types of processing operations for image-based search and prediction for physical defect investigations. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for image-based search and prediction for physical defect investigations can be employed to identify prior relevant images of physical defects, for example, for a live support agent and/or to obtain a prediction of the cause of a given physical defect and a corresponding recommendation of how the physical defect should be handled, using the predicted cause and one or more warranty policies.

One or more embodiments of the disclosure provide improved methods, apparatus and computer program products for image-based search and prediction for physical defect investigations. The foregoing applications and associated embodiments should be considered as illustrative only, and numerous other embodiments can be configured using the techniques disclosed herein, in a wide variety of different applications.

It should also be understood that the disclosed image-based search and prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for image-based search and prediction for physical defect investigations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based image-based search and prediction engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based image-based search and prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
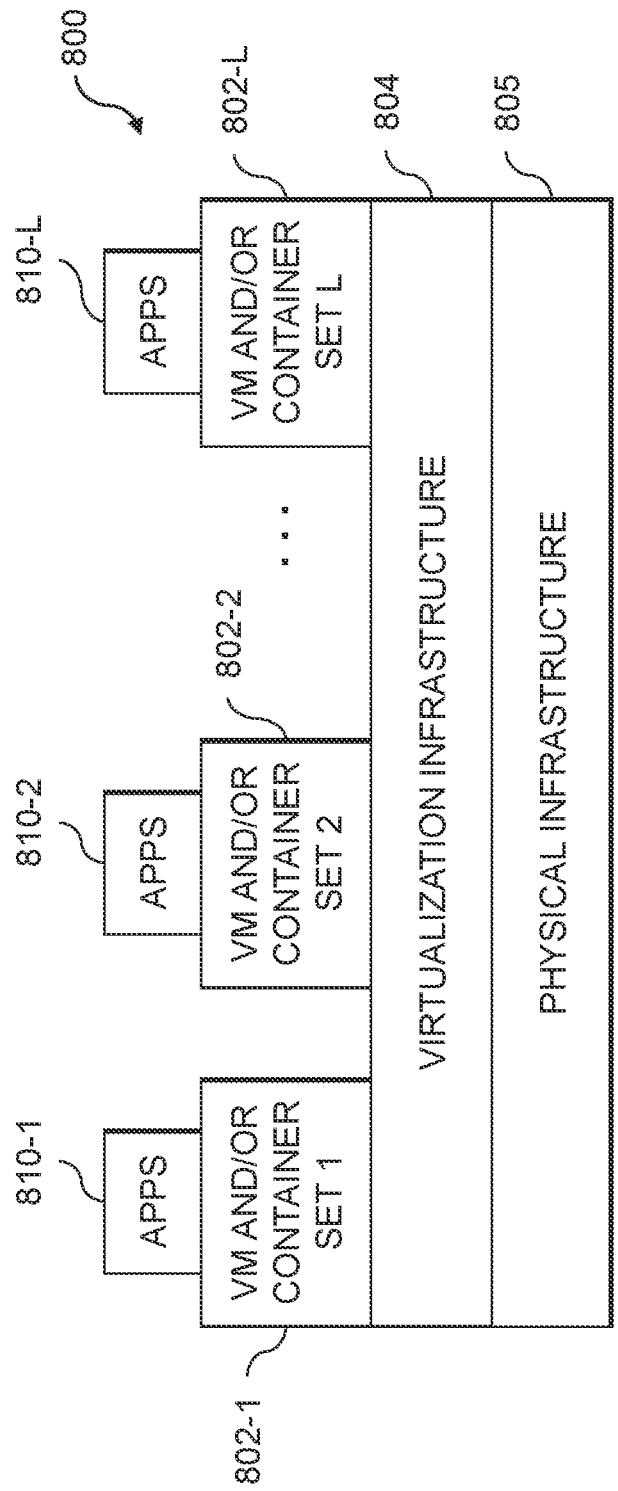
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide image-based search and prediction functionality of the type described above for one or more processes running on a given one of the VMs. For example, each of the VMs can implement image-based search and prediction control logic and associated policy-based physical defect resolution functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide image-based search and prediction functionality of the type described above for one or more processes running on different ones of the containers. For example, a container host device supporting multiple containers of one or more container sets can implement one or more instances of image-based search and prediction control logic and associated policy-based physical defect resolution functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
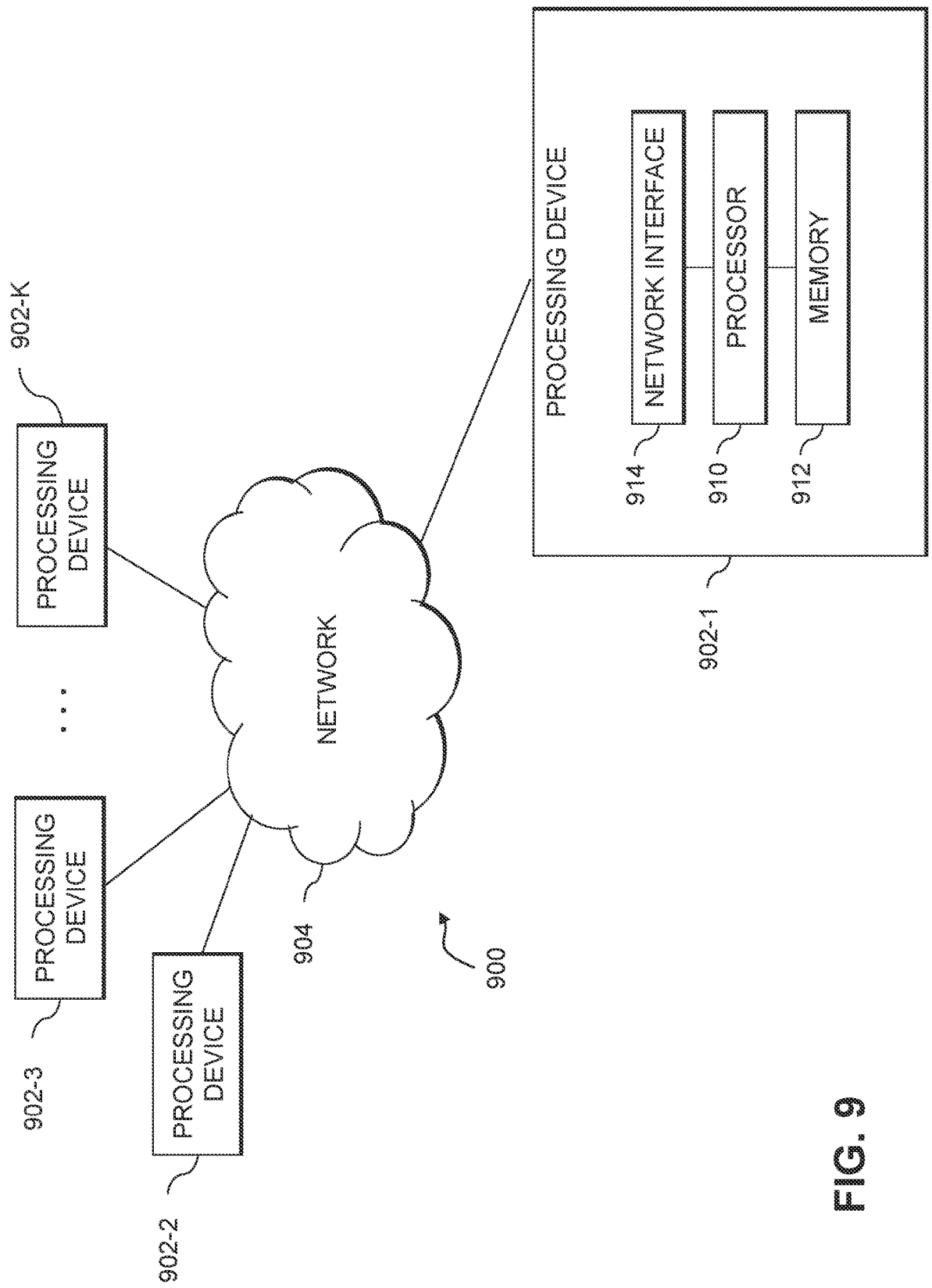
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, for each of a plurality of investigations of a physical defect associated with a corresponding device, (i) one or more images of the physical defect, (ii) a textual description of the physical defect, and (iii) a description of a classification of the physical defect; and
storing the one or more images for each investigation in a searchable image repository, wherein each stored image comprises a set of tags based at least in part on the corresponding textual description of the physical defect, the corresponding description of the classification of the physical defect and a description of the corresponding device, wherein the set of tags is stored with the respective stored image as metadata, and wherein the searchable image repository comprises an index based at least in part on the set of tags for a plurality of stored images;

wherein a given investigation of a physical defect is resolved at least in part by applying a textual description of the device associated with the given investigation and at least one symptom of the physical defect associated with the given investigation to an image-based search engine that identifies one or more images in the searchable image repository related to the applied textual description using the index of the searchable image repository;

wherein the method is performed by at least one processing device comprising a processor coupled to a memory.

2. The method of claim 1, wherein each textual description of the physical defect is obtained from a respective customer.

3. The method of claim 1, wherein each description of the classification of a resolution of a respective physical defect investigation is obtained from a corresponding support agent that investigated the respective physical defect.

4. The method of claim 1, further comprising training one or more image classification models using each of at least a plurality of the stored images with the corresponding textual description of the physical defect and the corresponding description of the classification of the physical defect by applying each stored image with the corresponding textual description of the physical defect to a training process, wherein the corresponding description of the classification of the physical defect is provided as a classification label.

5. The method of claim 4, further comprising generating a workflow recommendation of a next action by a support agent using one or more of the searchable image repository and the one or more trained image classification models.

6. The method of claim 5, wherein the one or more trained image classification models provide a predicted cause of the physical defect and a policy-based recommendation for a treatment of the given investigation under an applicable warranty.

7. The method of claim 1, further comprising identifying one or more images in the searchable image repository relevant to the given investigation by applying a textual description of the physical defect associated with the given investigation to the image-based search engine.

8. An apparatus comprising:
at least one processing device comprising a processor coupled to a memory;
the at least one processing device being configured to implement the following steps:
obtaining, for each of a plurality of investigations of a physical defect associated with a corresponding device, (i) one or more images of the physical defect, (ii) a textual description of the physical defect, and (iii) a description of a classification of the physical defect; and
storing the one or more images for each investigation in a searchable image repository, wherein each stored image comprises a set of tags based at least in part on the corresponding textual description of the physical defect, the corresponding description of the classification of the physical defect and a description of the corresponding device, wherein the set of tags is stored with the respective stored image as metadata, and wherein the searchable image repository comprises an index based at least in part on the set of tags for a plurality of stored images;

training one or more image classification models using each of at least a plurality of the stored images with the corresponding textual description of the physical defect and the corresponding description of the classification of the physical defect, wherein a given investigation of a physical defect is resolved at least in part by applying a textual description of the device associated with the given investigation and at least one symptom of the physical defect associated with the given investigation to an image-based search engine that identifies one or more images in the searchable image repository related to the applied textual description using the index of the searchable image repository.

9. The apparatus of claim 8, wherein each textual description of the physical defect is obtained from a respective customer.

10. The apparatus of claim 8, wherein each description of the classification of a resolution of a respective physical defect investigation is obtained from a corresponding support agent that investigated the respective physical defect.

11. The apparatus of claim 8, further comprising training one or more image classification models using each of at least a plurality of the stored images with the corresponding textual description of the physical defect and the corresponding description of the classification of the physical defect by applying each stored image with the corresponding textual description of the physical defect to a training process, wherein the corresponding description of the classification of the physical defect is provided as a classification label.

12. The apparatus of claim 11, further comprising generating a workflow recommendation of a next action by a support agent using one or more of the searchable image repository and the one or more trained image classification models.

13. The apparatus of claim 12, wherein the one or more trained image classification models provide a predicted cause of the physical defect and a policy-based recommendation for a treatment of the given investigation under an applicable warranty.

14. The apparatus of claim 8, further comprising identifying one or more images in the searchable image repository relevant to the given investigation by applying a textual description of the physical defect associated with the given investigation to the image-based search engine.

15. A non-transitory processor-readable storage medium having stored therein program code of one or more software programs, wherein the program code when executed by at least one processing device causes the at least one processing device to perform the following steps:
obtaining, for each of a plurality of investigations of a physical defect associated with a corresponding device, (i) one or more images of the physical defect, (ii) a textual description of the physical defect, and (iii) a description of a classification of the physical defect; and
storing the one or more images for each investigation in a searchable image repository, wherein each stored image comprises a set of tags based at least in part on the corresponding textual description of the physical defect, the corresponding description of the classification of the physical defect and a description of the corresponding device, wherein the set of tags is stored with the respective stored image as metadata, and wherein the searchable image repository comprises an index based at least in part on the set of tags for a plurality of stored images;

training one or more image classification models using each of at least a plurality of the stored images with the corresponding textual description of the physical defect and the corresponding description of the classification of the physical defect, wherein a given investigation of a physical defect is resolved at least in part by applying a textual description of the device associated with the given investigation and at least one symptom of the physical defect associated with the given investigation to an image-based search engine that identifies one or more images in the searchable image repository related to the applied textual description using the index of the searchable image repository.

16. The non-transitory processor-readable storage medium of claim 15, wherein each description of the classification of a resolution of a respective physical defect investigation is obtained from a corresponding support agent that investigated the respective physical defect.

17. The non-transitory processor-readable storage medium of claim 15, further comprising training one or more image classification models using each of at least a plurality of the stored images with the corresponding textual description of the physical defect and the corresponding description of the classification of the physical defect by applying each stored image with the corresponding textual description of the physical defect to a training process, wherein the corresponding description of the classification of the physical defect is provided as a classification label.

18. The non-transitory processor-readable storage medium of claim 17, further comprising generating a workflow recommendation of a next action by a support agent using one or more of the searchable image repository and the one or more trained image classification models.

19. The non-transitory processor-readable storage medium of claim 18, wherein the one or more trained image classification models provide a predicted cause of the physical defect and a policy-based recommendation for a treatment of the given investigation under an applicable warranty.

20. The non-transitory processor-readable storage medium of claim 15, further comprising identifying one or more images in the searchable image repository relevant to the given investigation by applying a textual description of the physical defect associated with the given investigation to the image-based search engine.

* * * * *